United States Patent [19]

Benzing

[11] Patent Number: 4,632,212
[45] Date of Patent: Dec. 30, 1986

[54] APPARATUS FOR GENERATING SEISMIC VIBRATION ENERGY IN A BOREHOLE

[75] Inventor: William M. Benzing, Oklahoma City, Okla.

[73] Assignee: Conoco Inc., Ponca City, Okla.

[21] Appl. No.: 435,414

[22] Filed: Oct. 20, 1982

[51] Int. Cl.$^4$ ............................................. G01V 1/40
[52] U.S. Cl. ..................................... 181/106; 367/35; 367/86; 367/151; 367/911
[58] Field of Search ............... 181/102, 104, 106, 110, 181/113, 105; 367/25, 75, 150, 151, 189, 911, 912, 35, 86

[56] References Cited

U.S. PATENT DOCUMENTS

| 2,878,886 | 3/1959 | Overton, Jr. | 181/104 |
| 3,028,752 | 4/1962 | Bacon | 367/151 |
| 3,330,375 | 7/1967 | White | 367/75 |
| 3,716,111 | 2/1973 | Lavergne | 181/113 |
| 3,895,688 | 7/1975 | Bouyoucos | 181/402 |
| 3,974,476 | 8/1976 | Cowles | 181/102 |
| 4,034,827 | 7/1977 | Leerskov, Jr. et al. | 181/120 |
| 4,042,063 | 8/1977 | Waters | 181/119 |
| 4,103,756 | 8/1978 | Trulio et al. | 181/121 |
| 4,319,345 | 3/1982 | Dennis | 181/104 |

FOREIGN PATENT DOCUMENTS 533896 10/1976 U.S.S.R. .

Primary Examiner—Salvatore Cangialosi
Assistant Examiner—K. R. Kaiser

[57] ABSTRACT

Apparatus for generation of shear or compressional type vibrations within a borehole wherein oppositely oriented first and second acoustic energy sources are energized to produce output tube waves which, in turn, are equally deflected to propagate energy toward opposite sides of the borehole. Energization of the sources in-phase effects output of compressional wave energy and energization of sources 180° out of phase results in shear wave generation.

8 Claims, 2 Drawing Figures

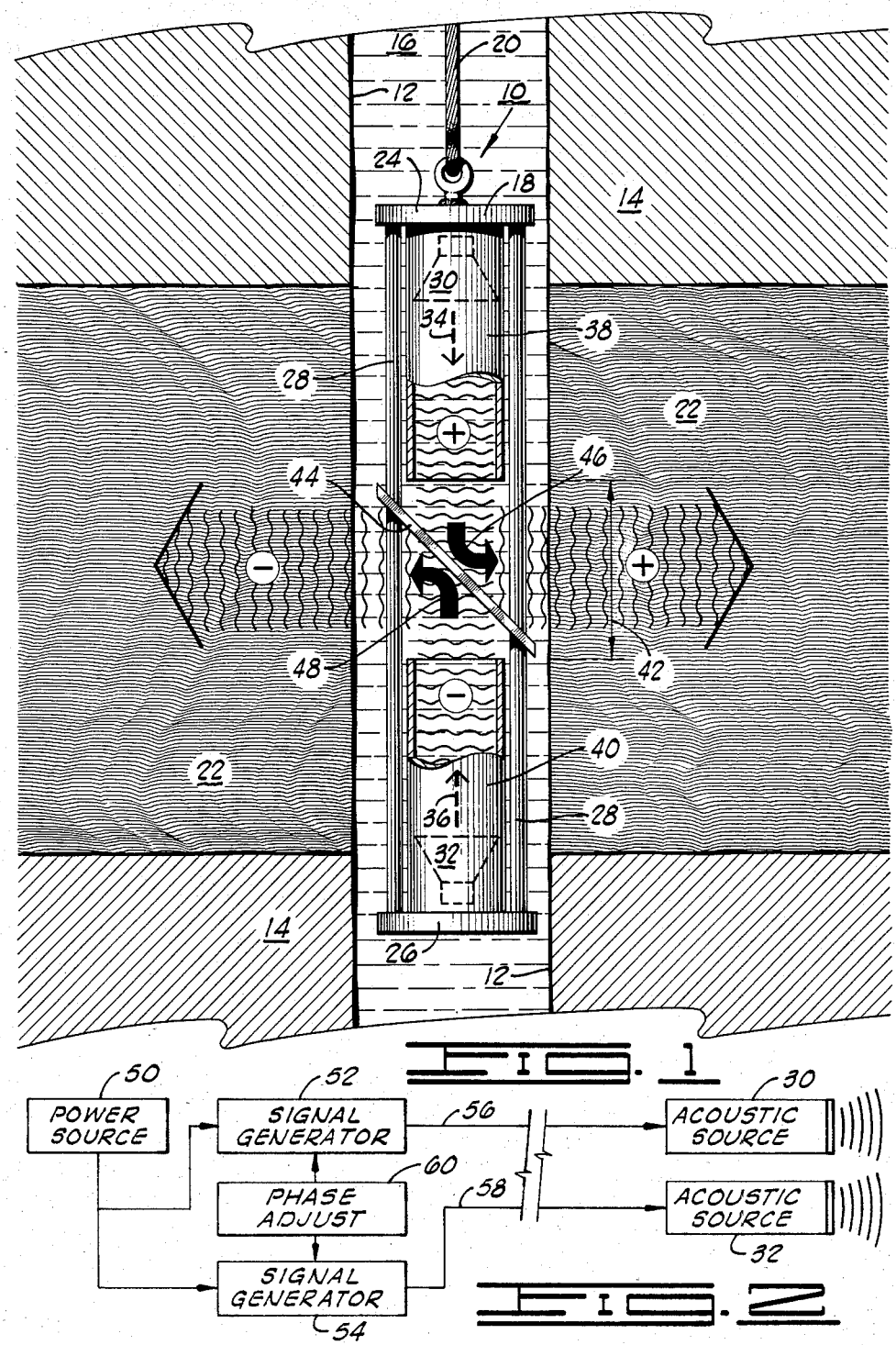

APPARATUS FOR GENERATING SEISMIC VIBRATION ENERGY IN A BOREHOLE

BACKGROUND OF THE INVENTION

1. Field of the Invention

The invention relates generally to borehole vibrator devices and, more particularly, but not by way of limitation, it relates to an improved type of vibrator utilizing opposed acoustic energy generation sources and an intermediate deflection plate whereby phase control of energy generation can vary the type of wave output.

2. Description of the Prior Art

The prior art includes numerous types of borehole seismic energy generator, some of which are quite old in the art. A search of the prior art discloses no device which utilizes in-line acoustic energy generators in co-action with an intermediate deflection plate. Also, applicant is not aware of any prior art that is directed to phase adjustment of dual sources of acoustic energy with a view toward adjusting the output wave induced in the earth medium selectively between shear wave and compressional wave operational mode.

SUMMARY OF THE INVENTION

The present invention relates to an improved seismic energy generator for use within an earth borehole, which source can be operatively controlled to generate either shear waves or compressional waves for propagation into the surrounding earth medium. The device uses the usual form of supporting frame and downhole support mechanism and the frame houses first and second acoustic energy sources secured in the support frame in spaced relationship but directing output energy each toward the other axially along the support frame. A deflector plate is disposed intermediate the acoustic energy sources in equal angular intersection of both oppositely traveling energy beams to provide radial reflection of the acoustic energy outward toward opposite sides of the borehole. First and second signal generators controlling the first and second acoustic sources may be phase varied so that in-phase wave generation results in a compressional wave generation in the surrounding earth medium, and 180° displaced source energization results in a transverse shear wave or shearing displacement of the borehole.

Therefore, it is an object of the present invention to provide a downhole device for selective generation of shear waves and/or compressional waves.

It is also an object of the present invention to provide an improved borehole energy source that is readily controllable as to output wave character.

It is yet further an object of the invention to provide a borehole generator capable of lighter weight and relatively ruggedized construction for use in well logging operations.

Finally, it is an object of the present invention to provide a versatile borehole seismic energy source that provides sufficient power output yet is simple and reliable of construction.

Other objects and advantages of the invention will be evident from the following detailed description when read in conjunction with the accompanying drawings which illustrate the invention.

BRIEF DESCRIPTION OF THE DRAWINGS

FIG. 1 is a view in elevation of the borehole generator in an operative environment as shown in idealized form with parts shown in cutaway; and FIG. 2 is a block diagram of suitable control circuitry for use with the seismic energy borehole generator of FIG. 1.

DETAILED DESCRIPTION OF THE INVENTION

Referring to FIG. 1, a borehole vibrator 10 is shown suspended in a borehole 12 within a subterranean earth structure 14. In normal operation, the borehole 10 is filled with borehole fluids 16 and the vibrator frame 18 is suspended by a surface-controlled suspension cable 20 adjacent selected earth formations of interest or stratum 22.

The borehole signal generating apparatus such as vibrator 10 is shown generally in FIG. 1 as the main support frame 18 may consist of such as upper and lower frame plates 24 and 26, respectively, as rigidly secured by a plurality of tie rods 28, e.g. a quadrature array of equal length rods 28. First and second acoustic energy sources 30 and 32 are suitably secured against the inside walls of frame plates 24 and 26 with direction of acoustic energy propagation (arrows 34 and 36, respectively) directed each toward the other along the common axis of vibrator 10. The acoustic energy sources 30 and 32 may be selected from a plurality of commercially available fluidtight sound sources of selected power output and frequency range. For example, the sources 30 and 32 may simply be high output underwater loudspeakers as are commercially available from such as Altech Lansing International, Oklahoma City, Oklahoma.

Each of sound sources 30 and 32 is housed in coaxial disposition within a respective mounting tube 38 and 40. Thus, the cylindrical tube 38 is secured as by welding to the underside of frame plate 18 in surround of upper sound source 30, and tube 38 extends downward nearly half of the length of vibrator 10. The similar lower tube 40 is secured to the inside of frame plate 26 in surround of sound source 32 to extend upward equally, i.e. to nearly half the length of vibrator 10. Each of tubes 38 and 40 may be formed of rigid metal, e.g. $\frac{1}{4}$″ stainless steel, and each should define a length from the face of respective sources 30 and 32 to the end of the tube that is on the order of twice the tube diameter. Thus, the tube openings terminate to define therebetween a central length 42 through which wave propagation may be effected.

A deflector plate 44 is rigidly secured relative to the tie rods 28 so that it lies at 45° to the central axis of vibrator 10 and each of the converging acoustic energy paths 34 and 36. The deflector plate 44 is preferably a polished flat plate of stainless steel of sufficient thickness, e.g. $\frac{1}{4}$″ to $\frac{1}{2}$″ thickness, so that it deflects acoustic energy without contributing damping or other interfering vibrations. Thus, the sides of vibrator 10 are open along the length 42 and deflected acoustic energy as at arrows 46 and 48 is propagated first through the borehole fluid and then through the wall of borehole 12 into opposite sides of stratum 22.

As shown in FIG. 2, control of energization of acoustic sources 30 and 32 is effected in conventional manner from associated surface equipment. A surface power source 50 is utilized to energize each of first and second signal generators 52 and 54 which provide energizing output via downhole cables 56 and 58 to the respective acoustic sources 30 and 32. The signal generators 52 and 54 may be such as a matched set of vibrator control generators such as are presently used in the art, such generators being capable of providing output of AC energizing power at selectively controlled frequency, time duration, and up or down frequency sweep rate. The signal generators may also provide a replica control signal output for comparison usage in correlation processing of received signal energy. A phase adjust circuit 60 is interconnected between signal generators 52 and 54 and serves to provide operator phase adjustment of output. Thus, phase adjust 60 may control ouputs on cables 56 and 58 to be in-phase, 180° out of phase, or other selected phase relationship as exigencies of operation may dictate.

In operation, the vibrator 10 may be utilized to generate seismic energy at a selected borehole position, and operator control of drive phase to the respective acoustic sources 30 and 32 will enable either shear wave or compressional wave generation. In FIG. 1, wave phase is illustrated by plus or minus signs. In a first case, energization of sound sources 30 and 32 at a similar frequency but 180° phase displacement (plus/minus) generates respective tube waves within tubes 38 and 40 which are 180° out of phase and this produces a pressure dipole as the tube waves reflect from opposite sides of deflector plate 44 through the adjacent fluid/borehole wall interface to stratum 22. Setting up of this phase displaced dipole of alternating pressure results in a transverse or shearing displacement of the borehole 12, thus propagating a shear wave in the surrounds.

If sources 30 and 32 are energized in phase, they produce respective in-phase tube waves which propagate against opposite sides of deflector plate 44 and proceed in-phase into opposite sides of borehole 12 into stratum 22. This propagation or plus/plus source effectively causes the borehole to expand and contract, alternately, thus producing a compressional wave within the earth formation adjacent the point source.

The foregoing discloses a novel form of acoustic energy vibrator that is especially adapted for utilization as a borehole energy source. Such an energy source is effective for use in both downhole logging operations and surface-detected seismic indication along a line of survey. The invention utilizes a novel form of dual source in controlled phase energy generation wherein either shear wave or compressional wave energy may be generated, selectively, at a borehole point source.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are defined as follows:

1. A signal generating apparatus for use in fluid-filled boreholes, comprising:

a frame for suspension in said borehole;
a tube having first and second ends and disposed in said frame a first acoustic energy source mounted in said first end to direct energy to a central point;
a second acoustic energy source mounted in said second end to direct energy to said central point;
an energy deflector plate disposed at 45 degrees to and along the axis of said tube central point at an equal angle to each of said and
means for energizing said first and second acoustic energy sources.

2. A signal generating apparatus as set forth in claim 1 wherein said means for energizing includes:
means for energizing the first and second sources in-phase to generate a compressional wave in the borehole.

3. A signal generating apparatus as set forth in claim 1 wherein said means for energizing includes:
means for energizing the first and second sources in opposite phase relationship thereby to generate a shear wave in the borehole.

4. A signal generating apparatus as set forth in claim 1 wherein said first and second acoustic energy sources each comprise:
a fluid-tight, electro-mechanical acoustic energy generator.

5. A signal generating apparatus as set forth in claim 1 wherein said means for energizing comprises:
first and second selectively frequency variable signal generators each connected to energize the respective first and second acoustic energy source;
phase adjust means connected to control the relative phases of said first and second signal generator; and
a power source energizing said first and second signal generators.

6. A signal generating apparatus as set forth in claim 1 wherein:
said first and second tubes are cylindrical and disposed in axial alignment with each being longer than its respective diameter.

7. A signal generating apparatus as set forth in claim 6 wherein:
each of said tubes is of the same diameter and a selected multiple of diameter measure in length.

8. An acoustic energy signal generating apparatus for use in a fluid-filled borehole, comprising:
frame means for operative suspension within said borehole;
first and second tubes secured in spaced disposition on common axis;
first and second acoustic energy generative means secured at opposite ends of said first and second tubes and generating acoustic wave energy toward a central point;
deflector plate means disposed at the central point at a similar angle to each of said first and second tubes to deflect acoustic wave energy into respective opposite sides of the borehole; and
means for energizing said first and second acoustic energy generating means.

* * * * *

UNITED STATES PATENT AND TRADEMARK OFFICE
CERTIFICATE OF CORRECTION

PATENT NO. : 4,632,212
DATED : December 30, 1986
INVENTOR(S) : William M. Benzing It is certified that error appears in the above-identified patent and that said Letters Patent are hereby corrected as shown below:

In the claims, column 4, line 8, "central point at an equal angle to each of said" should be deleted.

Signed and Sealed this

Eleventh Day of August, 1987

*Attest:*

DONALD J. QUIGG

*Attesting Officer*  *Commissioner of Patents and Trademarks*